US007035857B2

(12) United States Patent
Reeves et al.

(10) Patent No.: US 7,035,857 B2
(45) Date of Patent: Apr. 25, 2006

(54) METHOD AND APPARATUS FOR INCREASING THE FUNCTIONALITY AND EASE OF USE OF LIGHTS OUT MANAGEMENT IN A DIRECTORY ENABLED ENVIRONMENT

(75) Inventors: Drue A. Reeves, Magnolia, TX (US); Christopher Davenport, Houston, TX (US); E. David Neufeld, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 592 days.

(21) Appl. No.: 10/037,684

(22) Filed: Jan. 4, 2002

(65) Prior Publication Data

US 2003/0131113 A1   Jul. 10, 2003

(51) Int. Cl.
*G06F 17/30* (2006.01)
(52) U.S. Cl. ............................................. 707/10; 707/9
(58) Field of Classification Search .................... 707/1, 707/2, 9, 10; 345/738; 709/203, 208, 218, 709/223, 224, 225, 227, 229; 713/150, 168, 713/182, 200, 201
See application file for complete search history.

(56) References Cited

U.S. PATENT DOCUMENTS

| | | | | |
|---|---|---|---|---|
| 5,553,242 | A | * | 9/1996 | Russell et al. ............... 709/227 |
| 5,790,895 | A | | 8/1998 | Krontz et al. .................. 710/64 |
| 5,898,861 | A | | 4/1999 | Emerson et al. ............... 703/23 |
| 6,505,238 | B1 | * | 1/2003 | Tran ........................... 709/208 |
| 2003/0131246 | A1 | * | 7/2003 | Reeves et al. ............... 713/182 |

OTHER PUBLICATIONS

Tao Zhou, Exploring Netscape's Directory Server 3.0, Apr. 1998, pp. 1-11.*
Microsoft, Active Directory Overview, posted Jun. 30, 1999, pp. 1-11.*
Spencer et al., Installing and Configuring Active Directory, Prentice Hall PTR, May 2000, pp. 1-33.*
Emerson et al., "Operating System Independent Method and Apparatus for Graphical Remote Access," U.S. Appl. No. 09/438,253, filed Nov. 12, 1999.
Frantz et al., "USB Virtual Devices," U.S. Appl. No.: 09/544,573, filed Apr. 6, 2000.
Emerson et al., "Video Eavesdropping and Reverse Assembly to Transmit Video Action to a Remote Console," U.S. Appl. No.: 08/733,254, filed Oct. 18, 1996.
"Compaq Remote System Management for Industry-Standard Servers," Compaq Computer Corporation Technology Brief, Sep. 2001.
"Remote Server Management with Integrated Remote Console," Compaq Computer Corporation Technology Brief, Oct. 21, 1996.

* cited by examiner

Primary Examiner—Apu M. Mofiz (57) ABSTRACT

A technique is provided for managing network devices and computer systems via a remote directory environment. The remote directory environment organizes various resources, such as servers, in a directory structure and provides access rights and restrictions to the resources based on groups or roles. A user with the proper access rights is then able to access the desired resource, such as a server, and create or modify management operations, device configurations, and other tasks. The subject device may then be notified of the new or modified operation, configuration, or task. The subject device also may routinely or periodically retrieve various management tasks from the remote directory environment.

23 Claims, 6 Drawing Sheets

METHOD AND APPARATUS FOR INCREASING THE FUNCTIONALITY AND EASE OF USE OF LIGHTS OUT MANAGEMENT IN A DIRECTORY ENABLED ENVIRONMENT

BACKGROUND OF THE INVENTION

1. Field of the Invention

The present technique relates generally to network computer systems, such as client server computer systems. More particularly, the present technique relates to managing a remote networked device, such as a server, using a directory environment.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer networks comprise a broad array of personal computers, servers, and network devices, which communicate with one another for sharing resources. Many of these network computers and devices require hardware configuration, software installation, and various other maintenance and management procedures. Network managers typically provide these management procedures on-site. However, the current trend is to provide more of these procedures via remote management tools, particularly for headless servers and network devices. Headless devices generally refer to devices lacking user interaction components, such as a monitor, a keyboard, and a mouse. Remote management tools are particularly useful for network management, because these remote tools improve repair efficiency and reduce equipment downtime for the various network components.

Remote management tools allow a user, such as a network manager, to interact remotely with another network computer or device via the network. For example, the user may interact with a remote server to initiate a boot process for the user's computer, to obtain a desired file from a file system on the remote server, or to execute a variety of other software applications. Servers often comprise a variety of network management hardware and software, such as Internet server hardware and software. A headless server also may comprise a management module, such as a lights out management (LOM) board, for remotely managing the resources of the headless server. Unfortunately, existing remote management tools provide very limited interaction with the network management hardware and software. The user must directly login to each individual server or device to manage or interact with that device. Moreover, the login rights and management functions are typically stored on each individual device for that specific device, rather than providing a centralized location for the login rights and management functions. Existing remote management tools also fail to provide adequate control over access rights within each server or device.

Accordingly, a need exists for an integral remote management tool for network devices, such as servers and other computer systems. A further need exists for adequate control over access rights to each device and resource, particularly management functions. As described below, the present technique advantageously provides a directory enabled management system for remotely configuring, controlling, and generally managing network devices.

BRIEF DESCRIPTION OF THE DRAWINGS

Certain advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described in detail below, the present technique provides systems and methods for managing network devices (e.g., servers and other computer systems) via a directory environment. The directory environment organizes various resources, such as servers, in a hierarchical structure and provides access rights and restrictions to the resources. A user with the proper access rights is then able to access the desired resource, such as a server, and create or modify management operations, device configurations, and other tasks. The present technique also may monitor the directory environment for additions and changes, and then notify the subject device of the new or modified operation, configuration, or task. The subject device also may routinely or periodically retrieve various management tasks from the remote directory environment.

Figure 1:
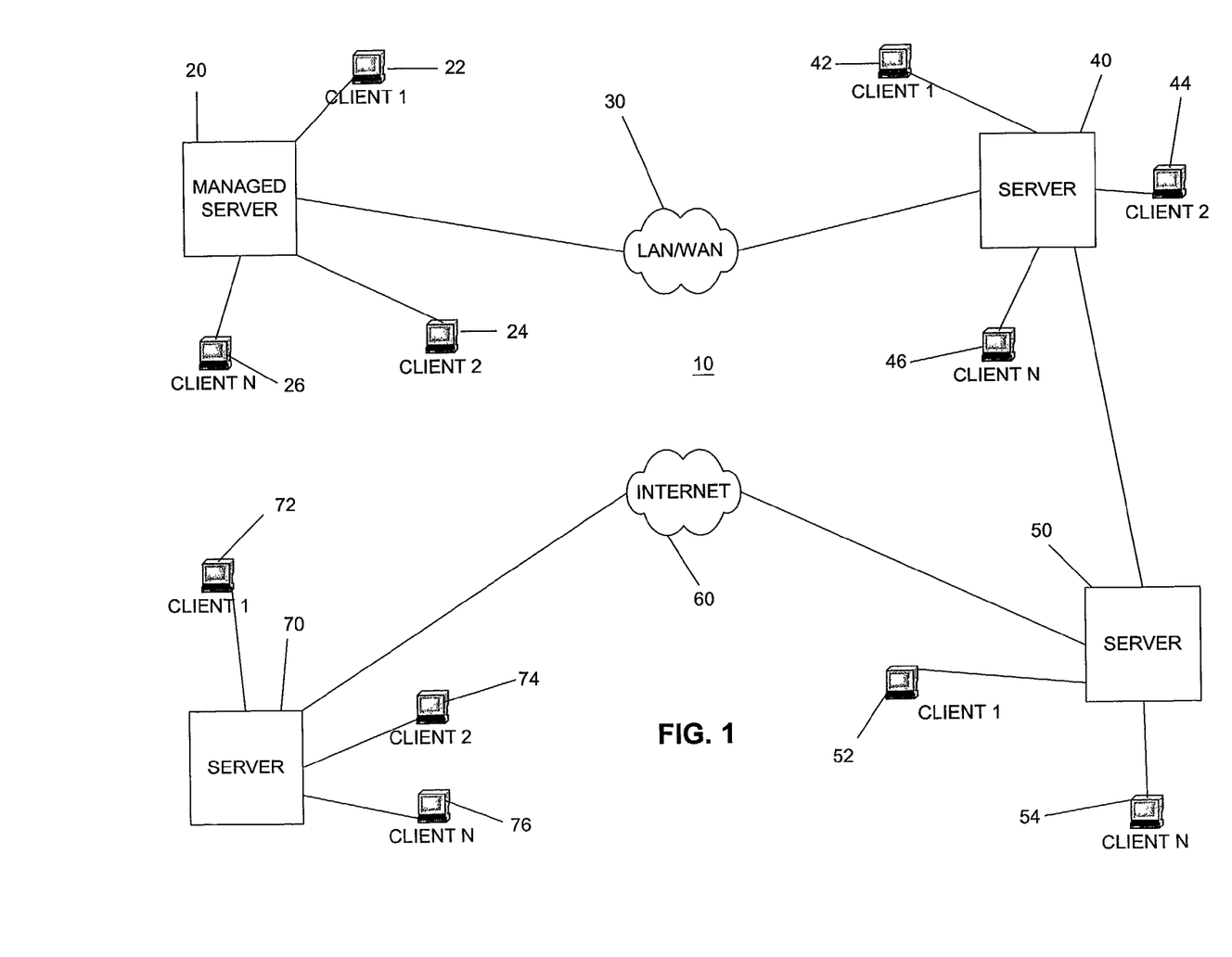
FIG. 1 is a block diagram illustrating an exemplary network of the present technique.

Turning now to the drawings and referring initially to FIG. 1, a block diagram of an exemplary computer network system in which the present invention may be practiced is illustrated and designated using a reference numeral 10. The computer network 10 is intended to illustrate a typical modem computer network configuration with all its complexities and flexibility. A managed server 20 is connected to a plurality of client computers 22, 24 and 26. For purposes of explaining the present embodiment clearly, only one server on the network 10 has been designated as a "managed server." In practice, those of skill in the art will appreciate that any or all of the servers in the network 10 could simultaneously include hardware and software devised according to the invention, making those servers "managed servers."

The managed server 20 may be connected to as many as n different client computers. The magnitude of n is a function of the computing power of the managed server 20. If the managed server has large computing power (for example, faster processor(s) and/or more system memory) relative to other servers on the network, it will be able to serve a relatively large number of client computers effectively.

The managed server 20 is connected via a typical network infrastructure 30, which may include any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Figure 2:
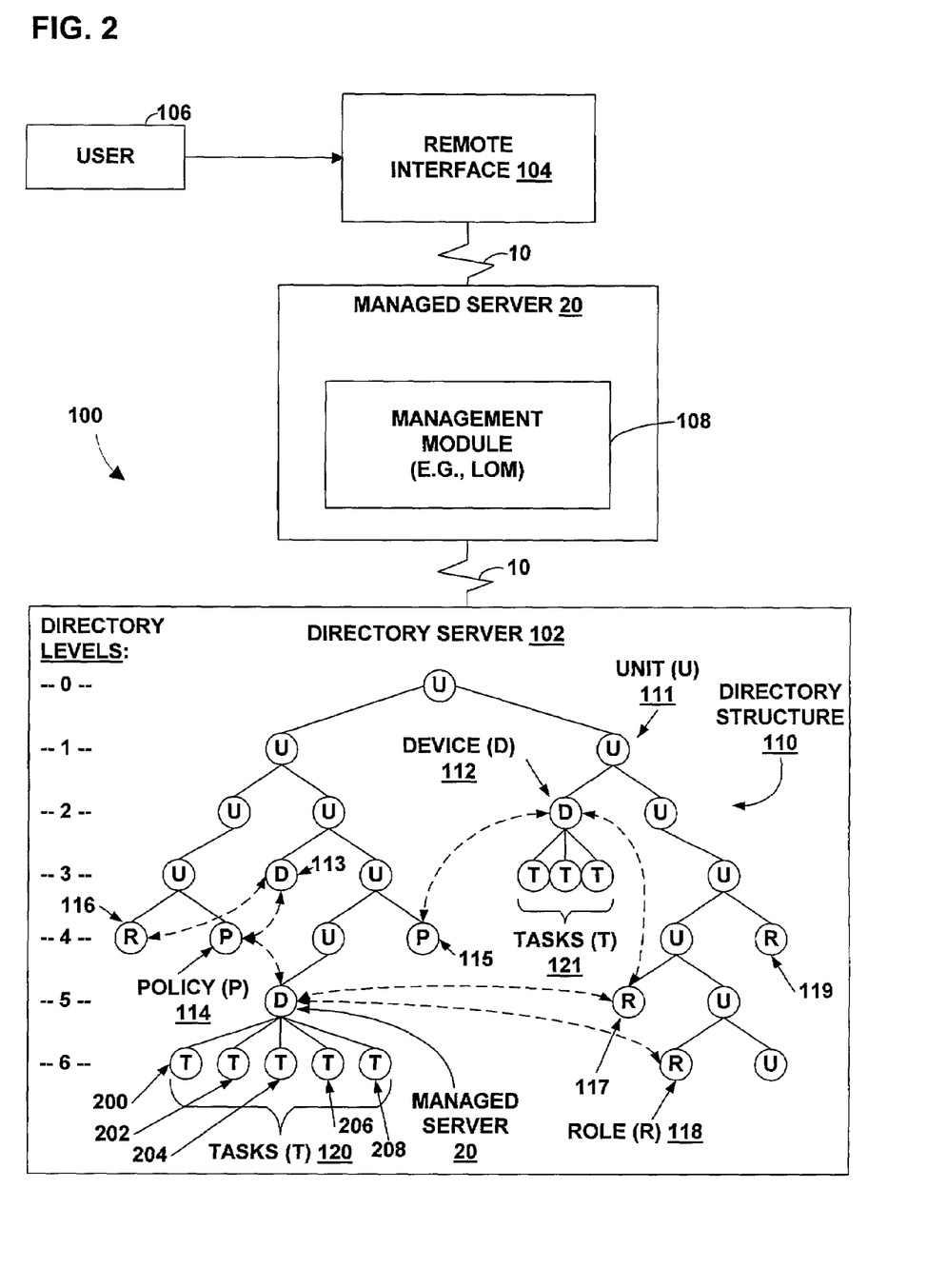
FIG. 2 is a block diagram illustrating an exemplary directory enabled management system of the present technique.

FIG. 2 is a block diagram illustrating an exemplary directory enabled management system 100 of the present technique. As illustrated, the system 100 comprises the managed server 20, a directory server 102 communicatively coupled to the managed server 20, and a remote interface 104 communicatively coupled to the managed server 20. A user 106 interacts with the managed server 20 and the directory server 102 via the remote interface 104, which may correspond to any of the client computer systems illustrated in the network 10 of FIG. 1. The system 100 also may have any number of servers and remote interfaces coupled to the directory server 102 via the network 10. In this exemplary embodiment, the managed server 20 comprises a management module 108 for managing various network resources. For example, the management module 108 may comprise a web server, a file system, a boot server, and various hardware and software applications. The management module 108 also may embody a "lights out" management (LOM) board, which is particularly well suited for use in a headless server lacking user interaction devices, such as a monitor, a keyboard, and a mouse. For example, the LOM board may be a Remote Insight Lights-Out Edition board from Compaq Computer Corp., Houston, Tex. The LOM board provides Web browser access to networked devices, such as servers, through a seamless, hardware-based, OS-independent graphical remote console. The LOM board provides full control of hardware and operating systems of the remote networked device through the Web browser no matter where the client is located.

The system 100 may use any suitable Web formats, communication protocols, directory service protocols, encryption techniques, and network security schemes. For example, the user 106 may interact with the managed server 20 through a Web page at the remote interface 104. The Web page may be formatted in the Hypertext Markup Language (HTML), the Extensible Markup Language (XML), the Voice Extensible Markup Language (VXML), the Extensible Hypertext Markup Language (XHTML), the compact HTML (cHTML), the electronic business Extensible Markup Language (ebXML), the Standard Generalized Markup Language (SGML), the Electronic Commerce Modeling Language (ECML), the Extensible Style Language (XSL), the ColdFusion Markup Language (CFML), or any other suitable markup language. The Web page also may include a variety of object-oriented menus, check-boxes, radio buttons, list boxes, and other directory objects to facilitate browsing through the various resources on the directory server 102. The present technique also may use a variety of directory structures, services, and access protocols. For example, the present technique may use directory services, such as the Novell Directory Services (NDS), Active Directory (AD), iPlanet, the X.500 ITU standard, or any other suitable directory service. The present technique also may use a directory access protocol, such as the Lightweight Directory Access Protocol (LDAP), the Netware Core Protocol (NCP), the Extensible Markup Language (XML), the Directory Service Markup Language (DSML), the Simple Object Access Protocol (SOAP), Universal Description, Discovery and Integration (UDDI), or any other suitable directory protocol. Accordingly, as described below, the system 100 facilitates remote configuration, control, and general management of the managed server 20 by directing the user 106 to the directory server 102. After the user 106 has specified the desired management functions for the managed server 20, the directory server 102 transmits the various device configuration, control, and management task data to the managed server 20 for execution by the managed server 20.

The directory server 102 comprises a plurality of management resources, user identification lists, user password lists, user roles, access rights for those user roles, and various device configuration policies and tasks disposed in a directory structure 110. As discussed in detail below, the user 106 may configure, modify, and assign tasks for the managed server 20, and any other desired server or device, through the directory structure 110 of the directory server 102. In this exemplary embodiment, the directory structure 110 comprises a plurality of levels, each comprising one or more nodes or organizational units (U), such as units 111. The units 111 of the directory structure 110 represent a variety of management information, such as a networked device (D), a device configuration policy (P), a user role (R), and a management task (T). Although the directory structure 110 is illustrated as a hierarchical tree with multiple branches and leaf-nodes, the present technique is applicable to any suitable directory organization. Accordingly, regardless of the particular organization of the directory structure, each device (D) points to a policy (P) and one or more roles (R), while the device (D) also may have one or more management tasks (T) assigned to a leaf-node below the device (D) by an authorized user having access rights to the device (D). Moreover, the specific management tasks (T), policies (P), and roles (R) may originate from any of the various levels/groups within the directory structure 110.

As illustrated in FIG. 2, the directory structure 110 comprises a device 112, a device 113, and the managed server device 20. The specific networked device (D) may represent any network resource or computer, such as a client computer, a server, a headless device, a lights out management (LOM) device, or any other desired resource. The directory structure 110 also comprises device configuration policies 114 and 115. The specific device configuration policy (P) may comprise a variety of device setup/configuration policies for the devices (D). Each device (D) can point to a single policy (P) node, while each policy (P) node can point to multiple devices (D) within the directory structure 110. Each policy (P) also can inherit device configuration policy data from other policy (P) nodes within the directory structure 110. The directory structure 110 also comprises roles 116, 117, 118, and 119. The specific user role (R) may comprise a variety of management rules and restrictions for authorized users within that user role (R). For example, the user role (R) may specify that the users of that role (R) are authorized to perform management functions A and B, but are restricted from performing management functions X, Y and Z. Each role (R) can point to multiple devices (D), while each device (D) can point to multiple roles (R) within the directory structure 110. Again, each role (R) can inherit rights and restrictions from other roles (R) within the directory structure 110. The management tasks (T) for the device (D) are assigned to the device (D) as sub-nodes or leaf-nodes to the device (D). As discussed in further detail below, each management task (T) object comprises a variety of management data for executing a task for the desired device (D). In this exemplary embodiment, tasks 120 have been assigned to the managed server device 20, while tasks 121 have been assigned to the device 112. For example, the user 106 may fall within one of the roles 117 and 118, which provide the user 106 with access rights and restrictions for managing the managed server device 20.

The user 106 is able to control or interact with the managed server 20 via the directory server 102, rather than directly by interacting with the managed server 20. Accordingly, if the user 106 requests a management session with the managed server 20, the managed server 20 directs the user's request to the directory server 102. After the directory server 102 authenticates the user's identity and password, the server 102 verifies that the user 106 falls within one of the roles 117 and 118 for controlling/managing the managed server 20. If the user 106 falls within one of the roles 117 and 118, and if the particular role provides the user 106 with rights encompassing the user's desired management task (T), then the user 106 may assign a task (T) to the managed server device 20. For example, the user 106 may assign one of the tasks 118, such as management tasks 200, 202, 204, 206, and 208.

Figure 3:
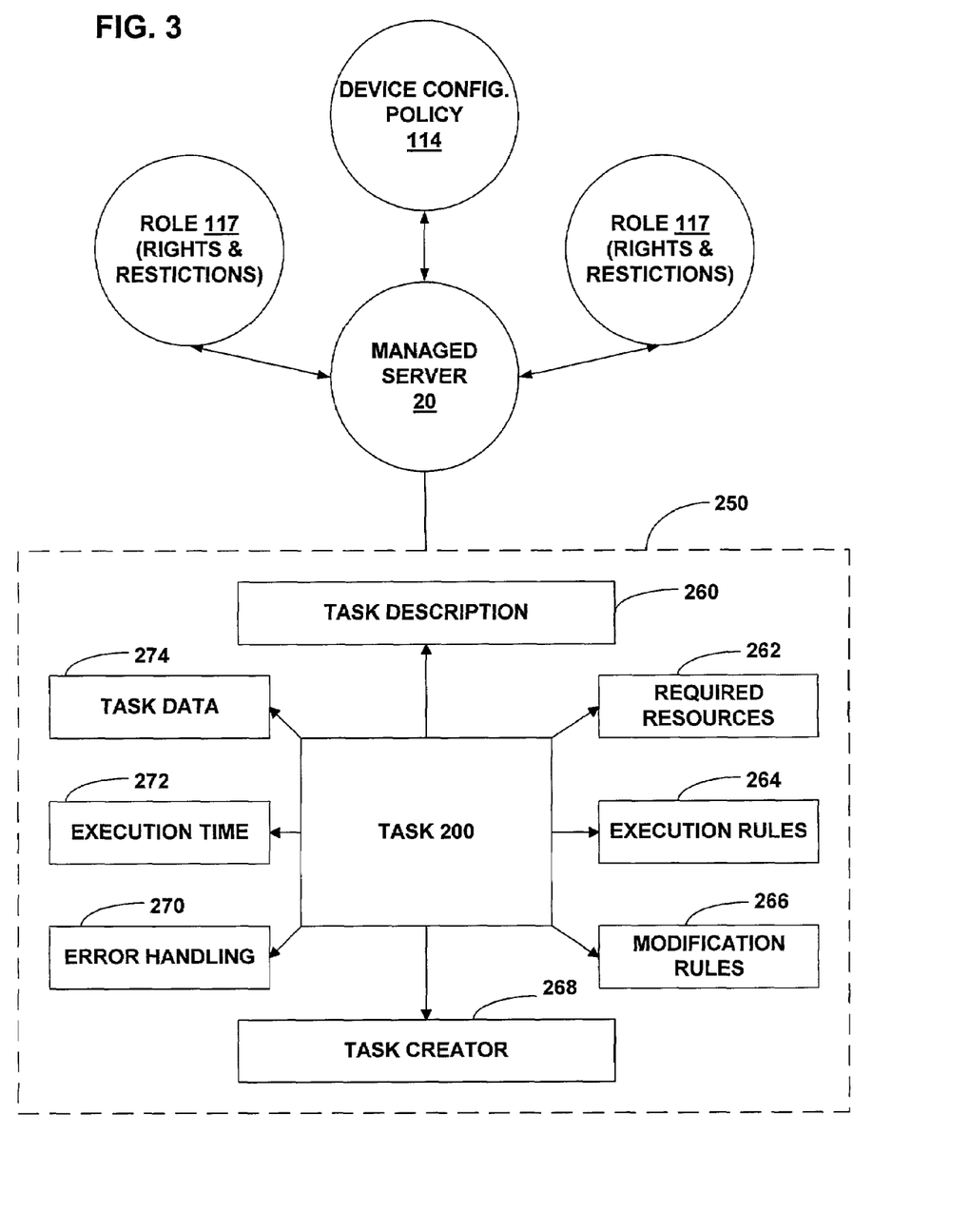
FIG. 3 is a block diagram illustrating an exemplary task initiated via the directory enabled management system of FIG. 2.

Accordingly, the foregoing directory structure 110, and the interrelationships 194 between the hierarchical levels and nodes, provide an efficient scheme for managing network resources. The management tasks created or modified by users at the various levels and nodes of the structure 110 may comprise a variety of functions and data for efficiently configuring or controlling the desired network resource, such as the managed server 20. As illustrated in FIG. 3, the task 200 created by the user 106 embodies a task object 250, which comprises a task description 260, required resources for the task 262, execution rules for the task 264, modification rules for the task 266, a task creator identification 268, error handling rules and procedures 270, an execution time for the task 272, and various other task data 274. For example, the task description 260 may identify the task 254 as a device configuration procedure, an antivirus scan, a software installation procedure, or any other desired procedure. The required resources 262 for the task may comprise memory requirements, processor requirements, and even resources of other remote network devices. The execution rules 264 and execution time 272 for the task 254 may specify triggers for executing the task, periodic times for the task, restrictions for performing the task, and any other suitable time and execution rules. Moreover, the task data 274 may comprise device configuration parameters, such as parameters derived from the device configuration policies, applications for executing the task, links to resources needed or desired for the task, and any other data required or potentially needed by the task 254.

Figure 4:
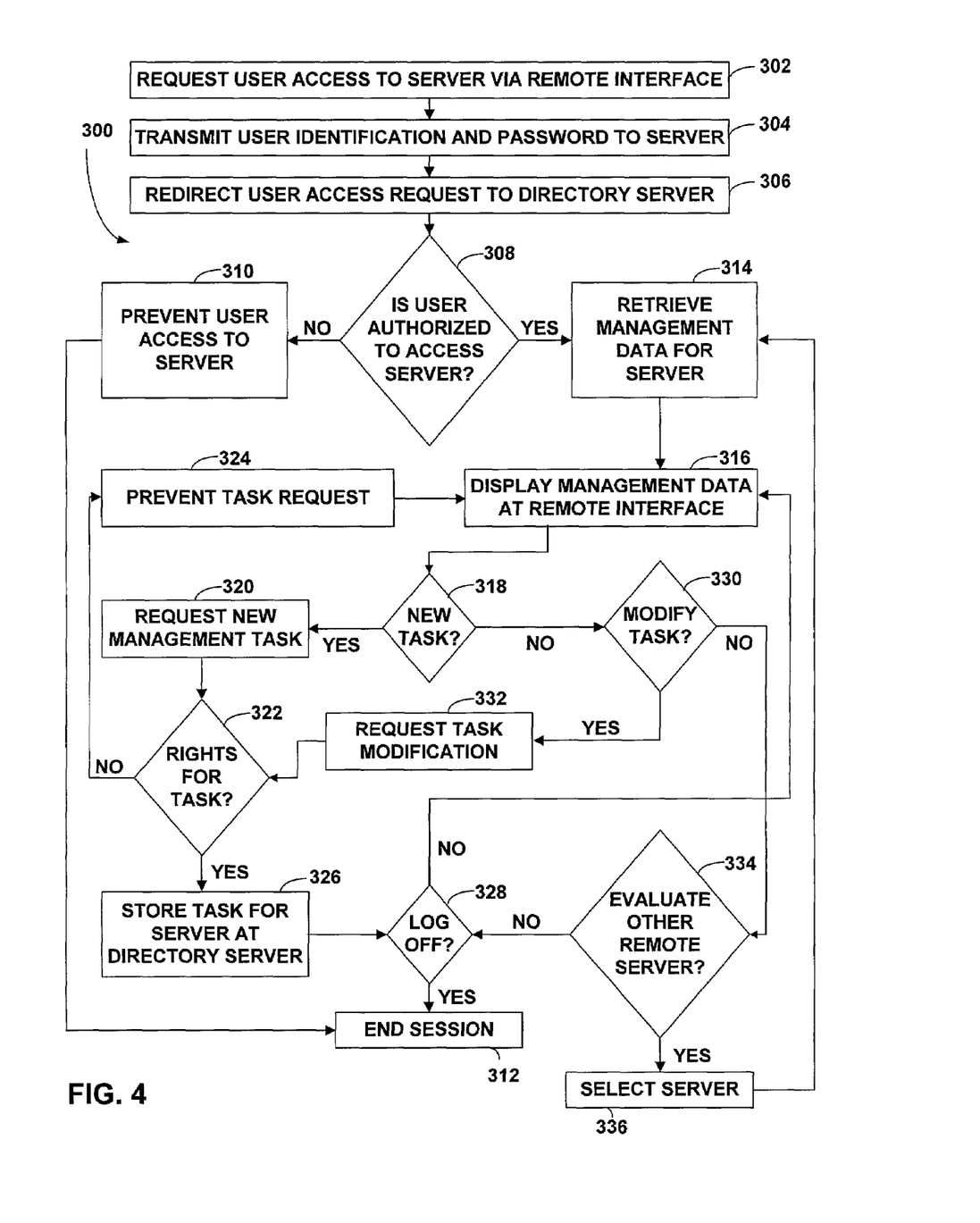
FIG. 4 is a flow chart illustrating an exemplary directory enabled management process for initiating or modifying a management task.
Figure 5:
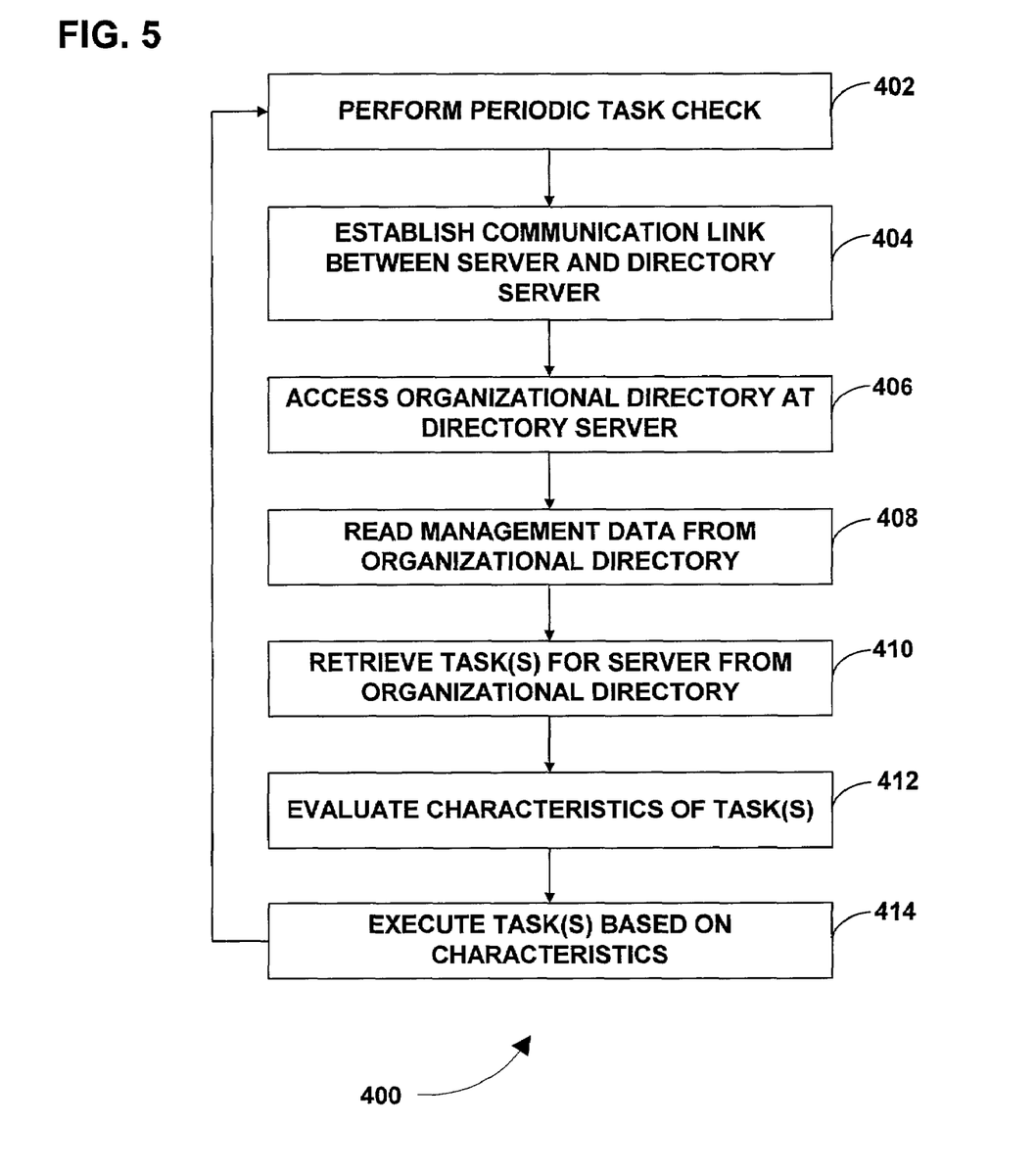
FIG. 5 is a flow chart illustrating an exemplary directory enabled task check process for retrieving new or modified management tasks.

FIG. 4 is a flow chart illustrating an exemplary directory enabled management process 300 for initiating or modifying a management task, such as the task object 250 illustrated in FIG. 5. Referring to FIGS. 2 and 4, the process 300 proceeds as the user 106 requests access to the server 20 via the remote interface 104 (block 302). The process 300 then transmits user identification and password information from the remote interface 104 to the server 20 via the network 10 (block 304). The server 20 receives this access request from the user 106, evaluates the request, and redirects the request to the directory server 102 (block 306). Alternatively, the user 106 may communicate with the directory server 102 directly. In this exemplary embodiment, the directory server 102 controls the initial access to the directory structure 110, while the roles (R) for the device (D) control the actual access/management of the device (D), such as the managed server 20. For example, the user 106 may interact with the directory server 102 and provide the requisite information, such as a user identification and password, to gain access to the directory server 102. The process 300 then queries whether the user is authorized to access the desired device (D), such as the managed server 20, by evaluating user identification and password data against roles (R) associated with the desired device (D) (block 308). For example, an application disposed at the directory server 102, at the managed server 20, or at any other location may proceed to compare the user's identity against the roles (R) for the desired device. If the process 300 determines that the user 106 does not have proper user identification and password information or proper access rights to the desired device (D), such as the managed 20 server 20, then the process 300 prevents user access to, and task management for, the desired device (D) (block 310). The process 300 may then allow the user 106 to select another network device, or the process 300 may proceed to end the management session for the server 20 (block 312). Accordingly, the process 300 of the present technique limits management control of the desired device (D), such as the managed server 20, to users having authorized access to the directory server 102 and also having authorized access to the desired device (D) as controlled by the roles (R) associated with the desired device (D).

If the directory server 102 determines that the user 106 does have proper user identification and password information and proper access rights for the server 20, then the process 300 proceeds to retrieve management data for the server 20 (block 314). The process 300 also may retrieve management data for various other network resources, which the user 106 has proper access rights to manage. Accordingly, the directory server 102 transmits the appropriate management data to the remote interface 104, where the process 300 displays the management data for viewing, modification, and general device management by the user 106 (block 316).

The process 300 then queries whether the user 106 desires to create a new task for managing the network resource, such as the server 20 (block 318). For example, the user 106 may browse through the directory structure 110 via the remote interface 104, select the desired network device, and select a type of management task from a drop-down menu or other selection tool. The process 300 then transmits a task request for the new management task from the remote interface 104 to the directory server 102 via the network 10 (block 320). The process 300 may then query whether the user 106 has proper rights for the requested task (block 322). For example, the directory server 102 can evaluate the requested task against the user's access rights and restrictions (e.g., the role for user 106) corresponding to the desired device, such as the managed server 20. If the user's access rights and restrictions (e.g., the user's role) do not allow the requested task, then the process 300 proceeds to prevent the task request (block 324). The process 300 then returns to block 316 for display of the management data at the remote interface. However, if the user's access rights and restrictions permit the requested task, then the process 300 proceeds to store the new management task for the desired device (e.g., the managed server 20) at the directory server 102 (block 326). As described in detail below, the directory server 102 can notify the managed server 20 of the new task, a monitoring application can identify the new task and notify the managed server 20, or the managed server 20 may periodically check the directory server 102 for new tasks. After storing the new task, the process queries whether the user 106 desires to logoff the directory server 102 (block 328). If the user does not desire further resource management, then the process 300 proceeds to end the current management session (block 312). Otherwise, the process returns to block 316 for display of the management data at the remote interface.

If the user 106 desires another new task, then the process 300 interacts with the user 106 to obtain a new request for a new management task (block 320). Otherwise, the process 300 proceeds to query whether the user 106 desires task modification of an existing device management task (block 330). For example, the user 106 can browse through the directory structure 110 via the remote interface 104, select the desired network device, and select an existing management task associated with the desired network device. If the user 106 modifies an existing task at the remote interface 104, then the user 106 can transmit a task request to the directory server 102 or the directory server may retrieve the task request from the remote interface 104 via the network 10 (block 332). The process 300 may then query whether the user 106 has proper rights for the requested task modification (block 322). For example, the directory server 102 may evaluate the requested task modification against the user's access rights and restrictions corresponding to the desired device, such as the managed server 20. If the user's access rights and restrictions (e.g., the user's role) do not permit the requested task modification, then the process 300 proceeds to prevent the task request (block 324). The process 300 then returns to block 316 for display of the management data at the remote interface. If the user's access rights and restrictions (e.g., the user's role) permit the requested task modification, then the process 300 proceeds to store the modified management task for the desired device (e.g., managed server 20) at the directory server 102 (block 326).

If the directory server 102 determines that the user 106 does not desire a task modification, then the process 300 queries whether the user 106 desires evaluation and management of another remote device or server (block 334). If the user 106 desires another device evaluation and management session, then the user 106 can proceed to select another network device or server (block 336). The process 300 then returns to block 314 for retrieval of the appropriate management data for the selected device or server, and the process 300 continues as described above. Otherwise, the process 300 queries whether the user 106 desires a system logoff from the directory server 102 (block 328). If the user 106 desires a system logoff, then the process 300 proceeds to end the current management session (block 312). Otherwise, the process 300 returns to block 316 for display of management data at the remote interface, and the process 300 continues as described above.

FIG. 5 is a flow chart illustrating an exemplary directory enabled task check process 400 for retrieving new or modified management tasks (e.g., task object 250 of FIG. 3) that are created or modified according to system 100 and process 300 of FIGS. 2 and 4, respectively. Any user, application, or device having access to the directory server 102 may perform the directory enabled task check process 400. However, in this exemplary embodiment, the managed server 20 routinely or periodically executes the directory enabled task check process 400 to retrieve and execute new or modified management tasks for the server 20. As illustrated, the managed server 20 executing the process 400 begins by performing a periodic task check for new or modified management tasks (block 402). Accordingly, the managed server 20 establishes a communication link between the server 20 and the directory server 102 (block 404). The managed server 20 then proceeds to access the organizational directory, such as the directory structure 110, resident at the directory server 102 (block 406). The initial access procedure performed by the managed server 20 may utilize any suitable directory access protocol, such as the Lightweight Directory Access Protocol (LDAP). For example, the managed server 20 may interact with the directory server 102 and provide login information, which the directory server 20 evaluates and verifies before giving the managed server 20 access to the directory structure 110. The managed server 20 then reads management data, such as device configuration policies and management tasks, which is associated with the server 20 in the directory structure 110 (block 408). If new or modified management tasks are associated with the server 20 at any of the hierarchical levels or nodes, then the managed server 20 proceeds to retrieve these management tasks from the organizational directory for execution at the server 20 (block 410). The process 400 may then evaluate the tasks (T) assigned to the managed server 20, and determine whether the creating user's access rights and restrictions (e.g., the user's role) allowed the creation of such management tasks (T). If the role(s) allowed such management tasks (T), then the process 400 may retrieve the tasks (T) and evaluate the various characteristics of the retrieved tasks, such as the task rules and characteristics illustrated in FIG. 3 (block 412). As described above with reference to FIG. 3, if the process 400 determines that the rules, restrictions, and requirements for the task are all met, then the managed server 20 can proceed to execute the tasks based on the task rules and characteristics (block 414). The process 400 then repeats by returning to block 402 for another task check from the directory server 102.

Figure 6:
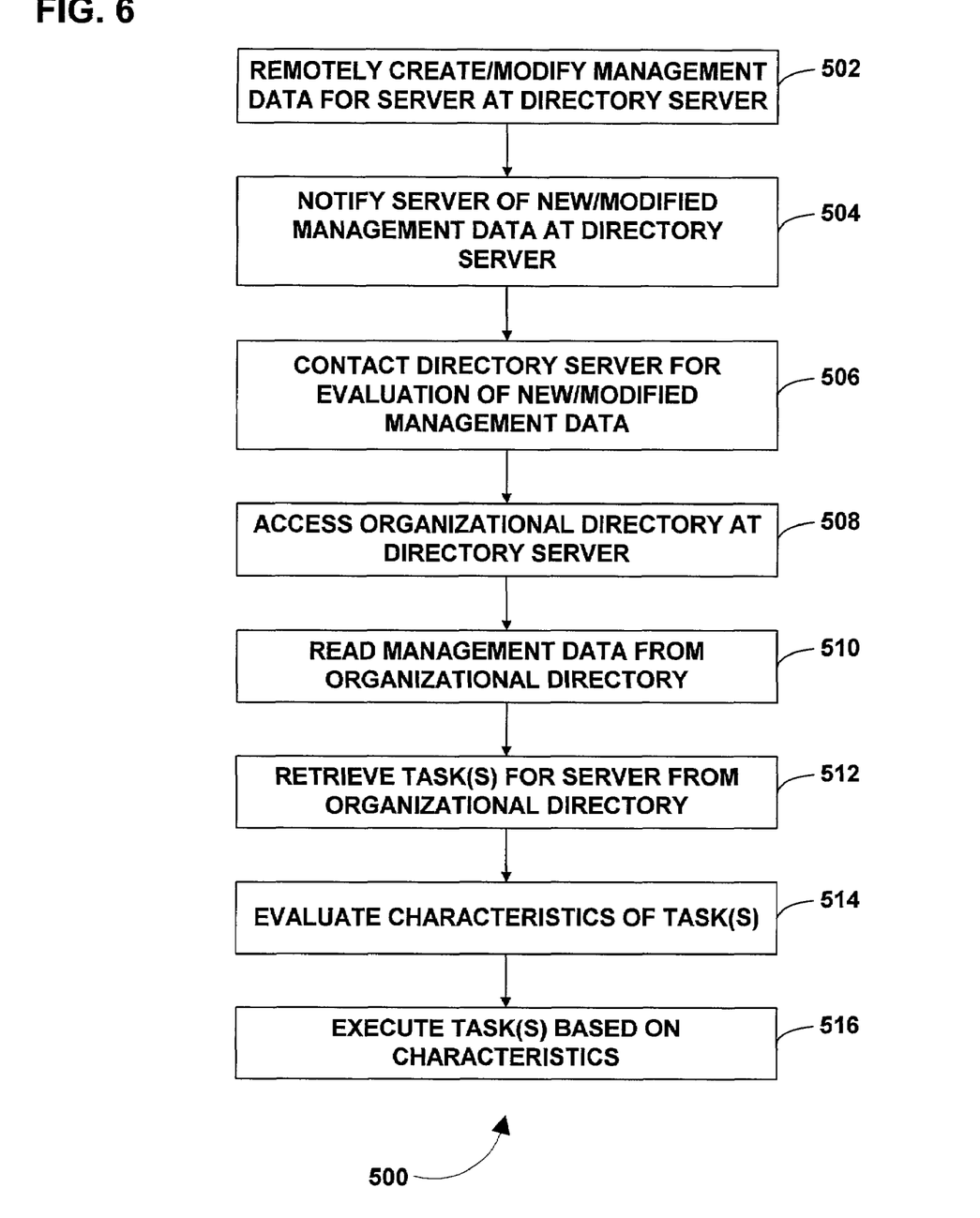
FIG. 6 is a flow chart illustrating an exemplary directory enabled task notification process for notifying a managed device of a new or modified management task.

FIG. 6 is a flow chart illustrating an exemplary directory enabled task notification process 500 for notifying a managed device of a new or modified management task (e.g., task object 250 of FIG. 3) that is created or modified according to system 100 and process 300 of FIGS. 2 and 4, respectively. As mentioned above with reference to FIG. 4, an application on the directory server 102, or in any suitable networked location, may monitor the directory structure 110 and notify the managed server 20 of a new or modified management task. Accordingly, the application can perform the process 500 beginning with the user's act of remotely creating or modifying management data, such as device configuration policies and management tasks, for the managed server 20 at the directory server 102 (block 502). Again, as described in detail above, the user must first gain access to the directory server 102, and then gain management control of the managed server 20 based on the user roles (R) for the managed server 20. If the user has management control of the managed server 20, then the user may create/modify a management task for the managed server 20. The process 500 then proceeds to notify the managed server 20 of the new or modified management data stored at the directory server 102 (block 504). For example, the application may notify the managed server 20 immediately upon creation or modification of a management task, or the server notification may occur after the user 106 has ended the management session with the directory server 102. In either scheme, the managed server 20 receives the task notification from the application, which may reside on the directory server 102 or any other networked location, and the managed server 20 proceeds to contact the directory server 102 for an evaluation of the new or modified management data (block 506). As described in detail above, the managed server 20 then proceeds to access the organizational directory (e.g., directory structure 110) resident at the directory server 102 (block 508). The managed server 20 then reads/gathers management data, such as device configuration policies and management tasks, which is associated with the server 20 in the directory structure 110 (block 510). If new or modified management tasks are associated with the server 20 at any of the hierarchical levels or nodes, then the managed server 20 proceeds to retrieve these management tasks from the organizational directory for execution at the server 20 (block 512). However, the managed server 20 may first evaluate whether the task creator(s) has proper access rights to create the task(s) based on the roles (R) associated with the managed server 20. If the new/modified tasks were created under proper role (R) rights and restrictions, then the process 500 evaluates the various characteristics of the retrieved tasks, such as the task rules and characteristics illustrated in FIG. 5 (block 514). As described above with reference to FIG. 5, if the process 500 determines that the rules, restrictions, and requirements for the task are all met, then the managed server 20 can proceed to execute the tasks based on the task rules and characteristics (block 516). The foregoing process 500 executes every time the user 106 creates or modifies a management task at the directory server 102.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the systems and methods described above may utilize any suitable network or Internet protocols, Web formats, directory service protocols, encryption techniques, and network security techniques.

What is claimed is:

1. A computer-implemented method of remote control for a networked device, comprising the acts of:
   receiving a request for a session with the networked device from a remote interface, wherein the networked device comprises a server;
   redirecting the request from the networked device to a directory server, the directory server comprising user logins and different access rights for a plurality of authorized users;
   providing a plurality of device control features for the networked device in the directory server, wherein the plurality of device control features include a first feature for configuring parameters of the networked device directly from the directory server and a second feature for executing a control task at the networked device directly from the directory server; and
   controlling access to the device control feature through the directory server based on the user logins and different access rights for the plurality of authorized users.

2. The method of claim 1, comprising the act of transmitting a command based on one or more of the plurality of device control features to the networked device via the directory server.

3. The method of claim 1, wherein the directory server comprises a hierarchical directory structure based on organizational groups of the plurality of authorized users.

4. The method of claim 1, comprising the act of remotely configuring the networked device via the directory server.

5. The method of claim 1, comprising the act of remotely controlling a management module disposed on the networked device via the directory server.

6. The method of claim 1, wherein the act of controlling access to the device control feature comprises the act of associating authorized user groups of the plurality of authorized users to the networked device.

7. The method of claim 1, comprising the act of providing an interface for the plurality of authorized users to interact with the directory server.

8. The method of claim 1, comprising the act of notifying the networked device of a control task generated by the device control feature.

9. The method of claim 1, comprising the act of providing an interface for the networked device to retrieve a control task generated by the device control feature.

10. The method of claim 1, wherein the server comprises a headless server.

11. A computer-implemented method, comprising the acts of:
    facilitating interaction between a remote client and a managed server of a plurality of networked devices via a directory server, wherein the directory server comprises user logins and access rights to the managed server for a plurality of authorized users, wherein the access rights are different for each of the plurality of authorized users;
    providing server controls for the managed server in the directory server;
    controlling access to the server controls based on the user logins and access rights; and
    transmitting directly from the directory server to the managed server a control task generated by the remote client using one of the server controls for execution by the managed server, wherein the act of transmitting the control task comprises the act of responding to a task request from the managed server.

12. The method of claim 11, wherein the act of facilitating interaction comprises the act of providing a hierarchical directory structure based on groups of the plurality of authorized users, each of the groups having at least one of the plurality of networked devices.

13. The method of claim 11, comprising the act of remotely configuring the managed server via the directory server.

14. The method of claim 11, server comprising the act of remotely controlling a management module disposed on the managed server via the directory server.

15. The method of claim 11, wherein the act of controlling access to the server controls comprises the act of associating authorized user groups of the plurality of authorized users to each of the networked devices.

16. The method of claim 11, wherein the act of transmitting the control task comprises the act of notifying the managed server of the control task.

17. The method of claim 11, wherein the managed server comprises a headless server.

18. A system of remote control for a plurality of networked devices, comprising:
a directory server, comprising:
a user database comprising user login data for each of a plurality of authorized users;
a resource database comprising identification data for the plurality of networked devices;
a resource access control database comprising access rights to the networked devices for each of the plurality of authorized users, wherein the access rights comprise a first right for a first user to setup a control task and a second right for a second user to modify the control task;
a device management system for the plurality of networked devices, the device management system adapted to configure and control the plurality of networked devices directly from the directory server in response to a task request from the networked devices;
a directory structure for the resource database; and
an interface for the directory structure adapted to facilitate interaction between the directory server, a remote console, and the plurality of networked devices.

19. The system of claim 18, wherein the access rights of the resource access control database comprise device rights and restrictions to manage each of the plurality of networked devices with the device management system.

20. The system of claim 18, wherein the directory structure comprises a plurality of organizational groups associated with at least one of the plurality of networked devices.

21. The system of claim 18, wherein the device management system comprises a plurality of control functions for each of the plurality of networked devices.

22. The system of claim 18, wherein one or more of the plurality of networked devices includes a managed server.

23. The system of claim 18, wherein one or more of the plurality of networked devices includes a headless server.

* * * * *

UNITED STATES PATENT AND TRADEMARK OFFICE
CERTIFICATE OF CORRECTION

PATENT NO. : 7,035,857 B2
APPLICATION NO. : 10/037684
DATED : April 25, 2006
INVENTOR(S) : Drue A. Reeves et al.

Page 1 of 1

It is certified that error appears in the above-identified patent and that said Letters Patent is hereby corrected as shown below:

In column 2, line 65, delete "modem" and insert -- modern --, therefor.

In column 6, line 44, after "managed" delete "20".

In column 11, line 9, in Claim 14, after "claim 11," delete "server".

Signed and Sealed this

Seventh Day of April, 2009

JOHN DOLL
*Acting Director of the United States Patent and Trademark Office*